(12) United States Patent
Zhang et al.

(10) Patent No.: US 12,490,910 B2
(45) Date of Patent: Dec. 9, 2025

(54) BLOOD PRESSURE PREDICTION METHOD AND DEVICE

(71) Applicant: Lepu Medical Technology (Beijing) Co., Ltd, Beijing (CN)

(72) Inventors: Biying Zhang, Beijing (CN); Jun Cao, Beijing (CN)

(73) Assignee: Lepu Medical Technology (Beijing) Co., Ltd, Beijing (CN)

( * ) Notice: Subject to any disclaimer, the term of this patent is extended or adjusted under 35 U.S.C. 154(b) by 555 days.

(21) Appl. No.: 17/904,672

(22) PCT Filed: Nov. 18, 2020

(86) PCT No.: PCT/CN2020/129629
§ 371 (c)(1),
(2) Date: Aug. 19, 2022

(87) PCT Pub. No.: WO2021/164345
PCT Pub. Date: Aug. 26, 2021

(65) Prior Publication Data
US 2023/0107787 A1    Apr. 6, 2023

(30) Foreign Application Priority Data
Feb. 21, 2020 (CN) .......................... 202010110288.3

(51) Int. Cl.
*A61B 5/021* (2006.01)
*A61B 5/00* (2006.01)

(52) U.S. Cl.
CPC ........ *A61B 5/02125* (2013.01); *A61B 5/7267* (2013.01); *A61B 5/7275* (2013.01)

(58) Field of Classification Search
CPC . A61B 5/02125; A61B 5/7267; A61B 5/7275; A61B 5/7235; A61B 5/02108
See application file for complete search history.

(56) References Cited

U.S. PATENT DOCUMENTS

2020/0015755 A1   1/2020   Zhao et al.

FOREIGN PATENT DOCUMENTS

| CN | 111358452 B | 12/1995 |
| CN | 107669256 A | 2/2018 |

(Continued)

OTHER PUBLICATIONS

S. Baek, J. Jang and S. Yoon, "End-to-End Blood Pressure Prediction via Fully Convolutional Networks," in IEEE Access, vol. 7, pp. 185458-185468, 2019 (Year: 2019).*

(Continued)

*Primary Examiner* — Eric F Winakur
*Assistant Examiner* — Sienna C Pyle
(74) *Attorney, Agent, or Firm* — TraskBritt

(57) ABSTRACT

A blood pressure prediction method includes performing data fragment division on the pulse wave; generating an input data tensor according to a total fragment number and the pulse wave data; performing multilayer convolution and pooling calculation on the input data tensor by using a blood pressure CNN to generate a feature data tensor; generating an input data matrix according to the feature data tensor; performing feature data regression calculation on the input data matrix by using a blood pressure ANN to generate a blood pressure regression data matrix; when a prediction mode identifier is a mean prediction identifier, performing mean diastolic pressure data calculation and mean systolic pressure data calculation to generate mean diastolic pressure data and mean systolic pressure data; or, when the prediction mode identifier is a dynamic prediction identifier, extracting diastolic and systolic pressure data to generate a predicted blood pressure data sequence.

7 Claims, 3 Drawing Sheets

(56) References Cited

FOREIGN PATENT DOCUMENTS

| | | | |
|---|---|---|---|
| CN | 107928654 A | 4/2018 | |
| CN | 108498089 A * | 9/2018 | ......... A61B 5/02108 |
| CN | 109833034 A | 6/2019 | |
| CN | 108498089 B | 3/2022 | |
| CN | 111358451 B | 7/2022 | |
| CN | 111248883 B | 8/2022 | |
| WO | 2011/041216 A1 | 4/2011 | |

OTHER PUBLICATIONS

International Search Report for Application No. PCT/CN2020/129629 dated Feb. 19, 2021, 3 pages.
International Written Opinion for Application No. PCT/CN2020/129629 dated Feb. 19, 2021, 5 pages.

* cited by examiner

BLOOD PRESSURE PREDICTION METHOD AND DEVICE

CROSS-REFERENCE TO RELATED APPLICATIONS

This application is a national phase entry under 35 U.S.C. § 371 of International Patent Application PCT/CN2020/129629, filed Nov. 18, 2020, designating the United States of America and published as International Patent Publication WO 2021/164345 A1 on Aug. 26, 2021, which claims the benefit under Article 8 of the Patent Cooperation Treaty to Chinese Patent Application Serial No. 202010110288.3, filed Feb. 21, 2020.

TECHNICAL FIELD

The disclosure relates to the technical field of electrophysiological signal processing, in particular, to a blood pressure prediction method and device.

BACKGROUND

The heart, as the center of blood circulation of the human body, beats rhythmically to generate a blood pressure to supply blood to the whole body to complete metabolism, and the blood pressure is one of the important physiological signals of the human body. Only when the blood pressure is within a normal range, the normal and cyclic flow of blood can be guaranteed. The blood pressure is kept normal under the combined action of many factors to ensure that all organs and tissues of the human body can obtain sufficient blood to function normally. The blood pressure has two important indicators: systolic pressure and diastolic pressure. Medically, whether the blood pressure is normal or not is determined in terms of these two indictors. By long-term and continuous observation of these two indicators, people may gain a clear understanding of their heart health. However, most traditional blood pressure measurement methods measures the blood pressure by way of an external force such as a pressure gauge, which not only makes the operation difficult, but also makes the subject uncomfortable, and thus, cannot be used repeatedly to monitor the blood pressure continuously.

BRIEF SUMMARY

In view of the defects of the prior art, the objective of the disclosure is to provide a blood pressure prediction method and device. First, photoplethysmography (PPG) data of a subject is acquired; and then, PPG-blood pressure data feature calculation and blood pressure data regression calculation are performed on the PPG data by way of an intelligent network model formed by a blood pressure convolutional neural network (CNN) model and a blood pressure artificial neural network (ANN) model to calculate blood pressure data (diastolic pressure and systolic pressure) of the subject. By adoption of the embodiments of the disclosure, the complexity and discomfort caused by conventional measurement methods are avoided, and an automatic and intelligent data analysis method is generated, so users can repeatedly and continuously monitor a measured object conveniently.

To fulfill the above objective, in a first aspect, the embodiments of the disclosure provide a blood pressure prediction method, comprising:

Performing pulse wave conversion and sampling on PPG signal data to generate a pulse wave one-dimensional data sequence, and performing data fragment division on the pulse wave one-dimensional data sequence according to a pulse wave data fragment length threshold to generate multiple pulse wave one-dimensional data fragments, wherein a total number of the pulse wave one-dimensional data fragments included in the pulse wave one-dimensional data sequence is used as a total fragment number;

Performing input data four-dimensional tensor construction of a blood pressure CNN according to the total fragment number and the pulse wave one-dimensional data sequence to generate an input data four-dimensional tensor;

Performing multilayer convolution and pooling calculation on the input data four-dimensional tensor by using the blood pressure CNN according to a preset convolutional layer number threshold to generate a feature data four-dimensional tensor;

Performing input data two-dimensional matrix construction of a blood pressure ANN according to the feature data four-dimensional tensor to generate an input data two-dimensional matrix;

Performing feature data regression calculation on the input data two-dimensional matrix by using the blood pressure ANN to generate a blood pressure regression data two-dimensional matrix [X, 2], wherein X is a second-dimensional parameter of the blood pressure regression data two-dimensional matrix [X, 2], and the value of X is the total fragment number;

Obtaining a prediction mode identifier, wherein the prediction mode identifier is a mean prediction identifier or a dynamic prediction identifier;

Performing mean diastolic pressure data calculation to generate predicted mean diastolic pressure data and performing mean systolic pressure data calculation to generate predicted mean systolic pressure data according to the blood pressure regression data two-dimensional matrix [X, 2] when the prediction mode identifier is the mean prediction identifier; or Performing diastolic pressure data and systolic pressure data extraction according to the blood pressure regression data two-dimensional matrix [X, 2] to generate a predicted blood pressure one-dimensional data sequence when the prediction mode identifier is the dynamic prediction identifier.

Preferably, the step of performing pulse wave conversion and sampling on PPG signal data to generate a pulse wave one-dimensional data sequence specifically comprises:

Calling a PPG signal acquisition and generation device to perform preset light signal acquisition on a local skin surface of a living body within a signal acquisition time threshold to generate the PPG signal data, wherein a preset light signal comprises at least one of a red light signal, an infrared light signal and a green light signal;

Performing pulse wave data conversion on the PPG signal data to generate pulse wave signal data; and Performing data sampling on the pulse wave signal data according to a pulse wave feature sampling frequency threshold to generate the pulse wave one-dimensional data sequence, wherein the pulse wave one-dimensional data sequence is specifically a pulse wave one-dimensional data sequence [A], and A is a first-dimensional parameter of the pulse wave one-dimensional data sequence [A] and is a product of the signal acquisition time threshold and the pulse wave feature sampling frequency threshold.

Preferably, the step of performing input data four-dimensional tensor construction of a blood pressure CNN according to the total fragment number and the pulse wave one-dimensional data sequence to generate an input data four-dimensional tensor specifically comprises:

Step 31, setting the input data four-dimensional tensor as an input data four-dimensional tensor $[B_1,H_1,W_1,C_1]$, wherein the input data four-dimensional tensor $[B_1,H_1,W_1,C_1]$ comprises $B_1$ pieces of three-dimensional tensor data $[H_1,W_1,C_1]$, $B_1$ is a fourth-dimensional parameter of the input data four-dimensional tensor $[B_1,H_1,W_1,C_1]$ and is equal to the total fragment number, $H_1$ is a third-dimensional parameter of the input data four-dimensional tensor $[B_1,H_1,W_1,C_1]$ and has a value of 1, $W_1$ is a second-dimensional parameter of the input data four-dimensional tensor $[B_1,H_1,W_1,C_1]$ and is equal to the pulse wave data fragment length threshold, and $C_1$ is a first-dimensional parameter of the input data four-dimensional tensor $[B_1,H_1,W_1,C_1]$ and has a value of 1;

Step 32, initializing all the three-dimensional tensor data $[H_1,W_1,C_1]$ in the input data four-dimensional tensor $[B_1,H_1,W_1,C_1]$ to be null, initializing a first index to 1, and initializing a first total number to the total fragment number;

Step 33, assigning values to matrix elements of the three-dimensional tensor data $[H_1,W_1,C_1]$, corresponding to the first index, in the input data four-dimensional sensor $[B_1,H_1,W_1,C_1]$ according to the pulse wave one-dimensional data fragment, corresponding to the index, in the pules wave one-dimensional data sequence;

Step 34, increasing the first index by 1;

Step 35, determining whether the first index is greater than the first total number; if the first index is greater than the first total number, performing Step 36; or, if the first index is less than or equal to the first total number, performing Step 33; and Step 36, transferring the input data four-dimensional tensor $[B_1,H_1,W_1,C_1]$ with the matrix elements being assigned with values to an upper application as an input data four-dimensional tensor construction result.

Preferably, the step of performing multilayer convolution and pooling calculation on the input data four-dimensional tensor by using the blood pressure CNN according to a preset convolutional layer number threshold to generate a feature data four-dimensional tensor specifically comprises:

Step 41, initializing a second index to 1, initializing a second total number to the convolutional layer number threshold, and initializing a second-index temporary four-dimensional tensor to the input data four-dimensional tensor;

Step 42, performing convolution calculation on the second-index temporary four-dimensional tensor by using a second-index convolutional layer of the blood pressure CNN to generate a second-index convolutional output data four-dimensional tensor, and performing pooling calculation on the second-index convolutional output data four-dimensional tensor by using a second-index pooling layer of the blood pressure CNN to generate a second-index pooling output data four-dimensional tensor, wherein the blood pressure CNN comprises multiple convolutional layers and multiple pooling layers;

Step 43, setting the second-index temporary four-dimensional tensor as the second-index pooling output data four-dimensional tensor;

Step 44, increasing the second index by 1;

Step 45, determining whether the second index is greater than the second total number; if the second index is greater than the second total number, performing Step 46; or, if the second index is less than or equal to the second total number, performing Step 42; and Step 46, setting the feature data four-dimensional tensor as the second-index temporary four-dimensional tensor.

Preferably, the step of performing input data two-dimensional matrix construction of a blood pressure ANN according to the feature data four-dimensional tensor to generate an input data two-dimensional matrix specifically comprises:

The feature data four-dimensional tensor being specifically a feature data four-dimensional tensor $[B_2,H_2,W_2,C_2]$, $B_2$ being a fourth-dimensional parameter of the feature data four-dimensional tensor $[B_2,H_2,W_2,C_2]$ and being equal to the total fragment number, $H_2$ being a third-dimensional parameter of the feature data four-dimensional tensor $[B_2,H_2,W_2,C_2]$, $W_2$ being a second-dimensional parameter of the feature data four-dimensional tensor $[B_2,H_2,W_2,C_2]$, and $C_2$ being a first-dimensional parameter of the feature data four-dimensional tensor $[B_2,H_2,W_2,C_2]$;

Performing tensor data dimension reduction on the feature data four-dimensional tensor $[B_2,H_2,W_2,C_2]$ to generate the input data two-dimensional matrix, wherein the input data two-dimensional matrix is specifically an input data two-dimensional matrix $[W_3,C_3]$, $W_3$ is a second-dimensional parameter of the input data two-dimensional matrix $[W_3,C_3]$ and is equal to $B_2$, and $C_3$ is a first-dimensional parameter of the input data two-dimensional matrix $[W_3,C_3]$ and is a product of $H_2$, $W_2$ and $C_2$.

Preferably, the step of performing mean diastolic pressure data calculation to generate predicted mean diastolic pressure data and performing mean systolic pressure data calculation to generate predicted mean systolic pressure data according to the blood pressure regression data two-dimensional matrix [X, 2] when the prediction mode identifier is the mean prediction identifier specifically comprises:

Extracting all fragment systolic pressure data included in the blood pressure regression data two-dimensional matrix [X, 2] to perform sum calculation to generate a systolic pressure sum, and generating the predicted mean systolic pressure data according to a quotient obtained by dividing the systolic pressure sum by the total fragment number; extracting all fragment diastolic pressure data included in the blood pressure regression data two-dimensional matrix [X, 2] to perform sum calculation to generate a diastolic pressure sum, and generating the predicted mean diastolic pressure according to a quotient obtained by dividing the diastolic pressure sum by the total fragment number; wherein the blood pressure regression data two-dimensional matrix [X, 2] comprises the total fragment number of regression data one-dimensional data sequences [2], and the regression data one-dimensional data sequences [2] comprise the fragment systolic pressure data and the fragment diastolic pressure data.

Preferably, the step of performing diastolic pressure data and systolic pressure data extraction according to the blood pressure regression data two-dimensional matrix [X, 2] to generate a predicted blood pressure one-dimensional data sequence when the prediction mode identifier is the dynamic prediction identifier specifically comprises:

When the prediction mode identifier is the dynamic prediction identifier, initializing a predicted blood pressure one-dimensional data sequence to be null, setting a blood pressure data set, initializing diastolic pressure data in the blood pressure data set to be null, and initializing systolic pressure data in the blood pressure data set to be null; and Sequentially extracting the recessive data one-dimensional data sequences [2] included in the blood pressure regression data two-dimensional matrix [X, 2] to generate a current data sequence [2]; setting the systolic pressure data in the blood pressure data set as fragment systolic pressure data of the current data sequence [2], and setting the diastolic pressure data in the blood pressure data set as fragment diastolic pressure data of the current data sequence [2]; and adding the blood pressure data set into the predicted blood pressure one-dimensional data sequence.

According to the blood pressure prediction method provided in the first aspect of the embodiments of the disclosure, a PPG acquisition device is used to acquire data of the subject, and an intelligent network model formed by a blood pressure CNN and a blood pressure ANN is used to predict blood pressure data (diastolic pressure and systolic pressure) according to acquired PPG data, and finally, a mean value or a dynamic blood pressure sequence of the predicted blood pressure data is output according to a prediction mode identifier.

In a second aspect, the embodiments of the disclosure provide equipment, comprising a memory and a processor, wherein the memory is used to store a program, and the processor is used to implement the method in the first aspect and in all implementations of the first aspect.

In a third aspect, the embodiments of the disclosure provide a computer program product comprising instructions, wherein when the computer program product runs on a computer, the computer implements the method in the first aspect and in all implementations of the first aspect.

In a fourth aspect, the embodiments of the disclosure provide a computer-readable storage medium having a computer program stored therein, wherein the computer program is executed by a processor to implement the method in the first aspect and in all implementations of the first aspect.

DETAILED DESCRIPTION

Figure 1:
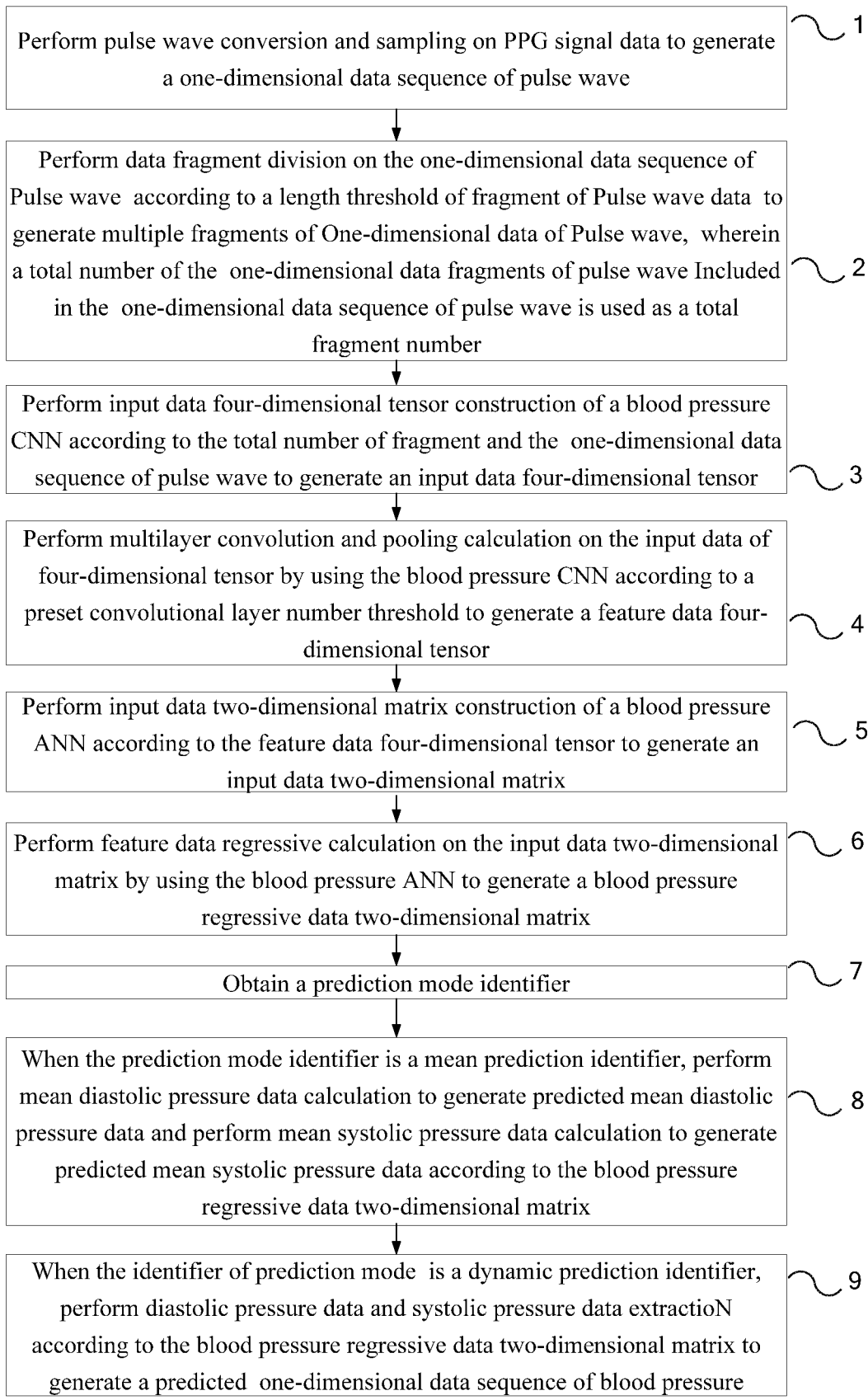
FIG. 1 is a schematic diagram of a blood pressure prediction method provided by Embodiment 1 of the disclosure.

To gain a better understanding of the purposes, technical solutions and advantages of the disclosure, the disclosure will be described in further detail below in conjunction with the accompanying drawings. Clearly, the embodiments in the following description are merely illustrative ones, and are not all possible ones of the disclosure. All other embodiments obtained by those ordinarily skilled in the art according to the following ones without creative labor should also fall within the protection scope of the disclosure.

Before the disclosure is expounded in further detail with reference to embodiments, some technical means involved in this specification will be briefly introduced below.

PPG signals are a set of signals used for recording the change of light intensity by identifying the light intensity of a specific light source with a light sensor. When the heart beats, the blood flow of unit area in blood vessels changes periodically, the blood volume changes correspondingly, and a PPG signal reflecting the light absorption capacity of blood also changes periodically. One cardiac cycle comprises two time periods: a systole period and a diastole period. In the systole period, the heart acts on blood in the whole body to make the pressure and blood flow volume in the blood vessels change continuously and periodically, and at this moment, the light absorption capacity of blood in the blood vessels is the largest. In the diastole period, the pressure applied to the blood vessels is relatively low, and at this moment, blood pushed to the whole body in the previous systole period cyclically impacts the heart valves to reflect and refract light to some extent, so less light energy is absorbed by blood in the blood vessels in the diastole period. So, the waves of PPG signals reflecting the light absorption capacity of blood in the blood vessels is formed by two superposed signals including a signal in the systole period and a signal in the diastole period. A common PPG signal has two peaks, of which one belongs to the systole period, and the other belongs to the diastole period.

A preliminarily acquired PPG signal has too many noises and interference sources, so filtering and denoising conversion needs to be performed on the PPG signal to obtain a signal that is regarded as a pulse wave signal capable of normally reflecting the pulse wave cycle of a subject. Feature recognition and regression classification are then performed on the pulse wave signal to obtain predicted values of the systolic pressure and diastolic pressure of the blood pressure. Specifically, valid data extraction, namely feature extraction or feature calculation, is performed on pulse wave data first; and then, blood pressure regression calculation is performed on obtained feature data to obtain regression data as a prediction result. Since each pulse wave signal comprises a systolic feature signal and a diastolic feature signal, two pieces of regression data, namely systolic data and diastolic data, are involved in blood pressure regression calculation, and the systolic data is greater than the diastolic data.

As known, the CNN has always been one of the key algorithms for feature calculation in the field of feature recognition. When applied to image recognition, the CNN is used, during fine classification and recognition, to extract discriminant features of images, which are then learned by other classifiers. When applied to the field of blood pressure feature recognition, the CNN is used for pulse wave feature extraction and calculation of input one-dimensional pulse wave data: after convolution and pooling processing of input original pulse wave data, feature data in conformity with pulse wave characteristics is reserved to be learned by other networks. A blood pressure CNN mentioned in this specification is a CNN model that has been subjected to blood pressure feature extraction training, and specifically includes convolutional layers and pooling layers, wherein the convolutional layers are used for blood pressure feature extraction and calculation of input data of the CNN model, and the pooling layers are used for down-sampling of an extraction result of the convolutional layers. The blood pressure CNN in this specification is divided into multiple CNN network layers, and each CNN network layer comprises a convolutional layer and a pooling layer. Input data and output data of the blood pressure CNN are both in the format of a four-dimensional tensor [B,H,W,C]. After being processed by each convolutional layer or pooling layer, the values of some dimensional parameters of the output data will change, that is, the total data length of the tensor will be decreased, as follows: B, as a fourth-dimensional parameter of the four-dimensional tensor (a total fragment number of a pulse wave one-dimensional data sequence), will not change; H and W, as a third-dimensional parameter and a second-dimensional parameter of the four-dimensional tensor, will change according to the size and sliding step of the convolution kernel of each convolutional layer; and C, as a first-dimensional parameter, of the four-dimensional tensor will change according to an output spatial dimension (the number of convolution kernels) selected in each convolutional layer.

The ANN is a complex network structure formed by a large number of processing units i.e., nerve cells that are connected together, and is the abstraction, simplification and simulation of the structure and operating mechanism of the human brain. The ANN simulates the activities of nerve cells through a mathematical model, and is an information processing system that is established by simulating the structure and function of the brain neural network. Commonly, the ANN is used for classification regression calculation of data. A blood pressure ANN involved in this specification is an ANN model that has been subjected to blood pressure classification regression training, and specifically includes a fully connected layer, wherein each node of the fully connected layer is connected to all nodes of the upper layer to integrate all previously extracted features for regression calculation and use a calculation result as an input of regression calculation of the next layer until a stop condition is met, and then, a final calculation result is output to the outside. Here, the input of the blood pressure ANN is a two-dimensional matrix, so an output result of the CNN needs to be converted from a four-dimensional tensor [B,H, W,C] into a two-dimensional matrix. The output of the blood pressure ANN is also a two-dimensional matrix [X, 2], a second-dimensional parameter X of the two-dimensional matrix [X, 2] is equal to B and represents the total fragment number, and the first-dimensional parameter 2 represents that the length of X one-dimensional data sequences in the matrix is 2. Each one-dimensional data sequence [2] comprises two values, of which the larger one is a systolic pressure predicted according to a corresponding one-dimensional data fragment of pulse wave, and the smaller one is a diastolic pressure predicted according to the corresponding one-dimensional data fragment of pulse wave.

Finally, the output of the blood pressure ANN is a pair of predicted blood pressure values, including systolic pressure and diastolic pressure, corresponding to each fragment, and these predicted blood pressure values may be processed in different ways. For example, the mean of these predicted blood pressure values is calculated to obtain mean blood pressure data within a signal acquisition time threshold; or, a blood pressure sequence is output directly to obtain a segment of dynamic blood pressure signals.

As shown in FIG. 1, which is a schematic diagram of a blood pressure prediction method provided by Embodiment 1 of the disclosure, the blood pressure prediction method mainly comprises the following steps:

Step 1, pulse wave conversion and sampling is performed on PPG signal data to generate a one-dimensional data sequence of pulse wave;

Step 1 specifically comprises: Step 11, a PPG signal acquisition and generation device is called to perform preset light signal acquisition on a local skin surface of a living body within a signal acquisition time threshold to generate the PPG signal, wherein a preset light signal comprises at least one of a red light signal, an infrared light signal and a green light signal;

Step 12, pulse wave data conversion is performed on the PPG signal data to generate pulse wave signal data; and Step 13, data sampling is performed on the pulse wave signal according to a frequency threshold of feature sampling for pulse wave to generate the one-dimensional data sequence of pulse wave, wherein the one-dimensional data sequence of pulse wave is specifically a one-dimensional data sequence [A] of pulse wave, and A is a first-dimensional parameter of the one-dimensional data sequence [A] of pulse wave and is a product of the time threshold for signal acquisition and the frequency threshold of feature sampling for pulse wave.

Here, the preset light signal comprises at least one of the red light signal, the infrared light signal and the green light signal.

Here, the one-dimensional data sequence of pulse wave is specifically the one-dimensional data sequence [A] of pulse wave, and A is the first-dimensional parameter of the one-dimensional data sequence [A] of pulse wave and is the product of the time threshold of signal acquisition and the frequency threshold of feature sampling for pulse wave. For example, assume the time threshold of signal acquisition is 10 s and the frequency threshold of feature sampling for pulse wave is 125 Hz, A=125*10=1250, which indicates that 1250 pieces of data are acquired. The one-dimensional data sequence [A] of pulse wave is specifically a one-dimensional data sequence of pulse wave, and is a one-dimensional data sequence that comprises 1250 pieces of independent pulse wave data.

Step 2, Data fragment division is performed on the one-dimensional data sequence of pulse wave according to a length threshold of pulse wave data fragment to generate multiple one-dimensional data fragments of pulse wave, wherein a total number of the one-dimensional data fragments of pulse wave included in the one-dimensional data sequence of pulse wave is used as a total fragment number.

Here, considering the input requirements of a blood pressure CNN that will be used later to perform feature calculation on data in the one-dimensional data sequence of pulse wave, fragment division is performed on the one-dimensional data sequence of pulse wave according to a maximum input data length of the blood pressure CNN, and the length threshold of data fragment for pulse wave is the maximum input data length of the blood pressure CNN. The total fragment number is set as follows: if a total data length of the one-dimensional data sequence of pulse wave can be evenly divided by the length threshold of data fragment for pulse wave, the total fragment number is a quotient obtained by dividing the one-dimensional data sequence of pulse wave by the length threshold of data fragment for pulse wave; or, if the total data length of the one-dimensional data sequence of pulse wave cannot be evenly divided by the t length threshold of data fragment for pulse wave, the total fragment number is a round-off number of the quotient obtained by dividing the pulse wave one-dimensional data sequence by the length threshold of data fragment for pulse wave, and the last fragment that is not long enough is abandoned as an incomplete data fragment. For example, assume the length threshold of data fragment of pulse wave is 250, the total fragment number is 1250/250=5; assume the length threshold of pulse wave for data fragment is 200, the total fragment number is |1250/200|=6.

Step 3, input data four-dimensional tensor construction of a blood pressure CNN is performed according to the total fragment number and the one-dimensional data sequence of pulse wave to generate an four-dimensional tensor for input data;

Step 3 comprises: Step 31, the input four-dimensional tensor is set as an input four-dimensional tensor $[B_1,H_1,W_1,C_1]$;

Wherein, the input four-dimensional tensor $[B_1,H_1,W_1,C_1]$ comprises $B_1$ pieces of three-dimensional tensor data $[H_1,W_1,C_1]$, $B_1$ is a fourth-dimensional parameter of the input four-dimensional tensor $[B_1,H_1,W_1,C_1]$ and is equal to the total fragment number, $H_1$ is a third-dimensional parameter of the input four-dimensional tensor $[B_1,H_1,W_1,C_1]$ and has a value of 1, $W_1$ is a second-dimensional parameter of the input four-dimensional tensor $[B_1,H_1,W_1,C_1]$ and is equal to the length threshold of data fragment of pulse wave, and $C_1$ is a first-dimensional parameter of the input four-dimensional tensor $[B_1,H_1,W_1,C_1]$ and has value of 1;

Here, the data fragments of pulse wave are converted into four-dimensional data, and the four dimensions [B, H, W, C] respectively represent the number of fragments (batch), the height of fragment data (height), the width of fragment data (width), and the channel of fragment data (channel). When colored image data is processed, the height, width and channel of fragments respectively correspond to the height, width and RGB channel of an image. Because pulse wave data is a one-dimensional time sequence, the number of fragments B should be set as the total fragment number, the height H should be set to 1, the channel C should be set to 1, and the width W should be set as a previously set fragment length, namely the length threshold of data fragment of pulse wave. For example, assume the length threshold of data fragment of pulse wave is 250, an input four-dimensional tensor obtained by converting the one-dimensional data sequence of pulse wave is $[B_1,H_1,W_1,C_1]$, which is specifically an input four-dimensional tensor [5,1,250,1];

Step 32: all the three-dimensional tensor data $[H_1,W_1,C_1]$ in the input four-dimensional tensor $[B_1,H_1,W_1,C_1]$ is initialized to be null, a first index is initialized to 1, and a first total number is initialized to the total number of fragments;

Step 33: values are assigned to matrix elements of the three-dimensional tensor data $[H_1,W_1,C_1]$, corresponding to the first index, in the input four-dimensional sensor $[B_1,H_1,W_1,C_1]$ according to the one-dimensional fragment of pulse wave, corresponding to the first index, in the one-dimensional data sequence of pules wave;

Here, the three-dimensional tensor data $[H_1,W_1,C_1]$ is three-dimensional tensor data [1, the length threshold of data fragment of pulse wave, 1], that is, the third-dimensional parameter and the first-dimensional parameter are both 1, which indicates that the three-dimensional tensor data $[H_1,W_1,C_1]$ is actually a one-dimensional data sequence (or vector), which needs to be represented in the form of a three-dimensional tensor (three-dimensional vector) since a calculation factor of blood pressure CNN is in the format of the four-dimensional tensor. Assume the length threshold of data fragment of pulse wave is 250 and the one-dimensional data sequence of pulse wave [1250] is divided into 5 fragments, the input four-dimensional tensor is [5,1,250,1], and each fragment of one-dimensional data sequence of pulse wave corresponds to one piece of three-dimensional tensor [1,250,1];

Step 34: the first index is increased by 1;

Step 35: whether the first index is greater than the first total number is determined; if the first index is greater than the first total number, Step 36 is performed; or, if the first index is less than or equal to the first total number, Step 33 is performed; and Step 36: the input four-dimensional tensor $[B_1,H_1,W_1,C_1]$ with the matrix elements being assigned with values is transferred to an upper application as a construction result for the input four-dimensional tensor.

Step 4, multilayer convolution and pooling calculation is performed on the input four-dimensional tensor by using the blood pressure CNN according to a preset threshold of convolutional layer number to generate a feature data of four-dimensional tensor;

Step 4 comprises: Step 41, a second index is initialized to 1, a second total number is initialized to the threshold of convolutional layer number, and a second-index temporary four-dimensional tensor is initialized to the input four-dimensional tensor;

Step 42, convolution calculation is performed on the second-index temporary four-dimensional tensor by using a second-index convolutional layer of the blood pressure CNN to generate a second-index convolutional output data of four-dimensional tensor, and pooling calculation is performed on the second-index convolutional output data of four-dimensional tensor by using a second-index pooling layer of the blood pressure CNN to generate a second-index pooling output data of four-dimensional tensor, wherein the blood pressure CNN comprises multiple convolutional layers and multiple pooling layers;

Here, the blood pressure CNN comprises multiple layers, and each layer comprises one convolutional layer and one pooling layer;

Step 43, the second-index temporary four-dimensional tensor is set as the second-index pooling output data of four-dimensional tensor;

Step 44, the second index is increased by 1;

Step 45, whether the second index is greater than the second total number is determined; if the second index is greater than the second total number, Step 46 is performed; or, if the second index is less than or equal to the second total number, Step 42 is performed; and Step 46, the feature data of four-dimensional tensor is set as the second-index temporary four-dimensional tensor $[B_2,H_2,W_2,C_2]$;

Wherein, $B_2$ is a fourth-dimensional parameter of the feature data of four-dimensional tensor $[B_2,H_2,W_2,C_2]$ and is equal to the total number of fragments, $H_2$ is a third-dimensional parameter of the feature data of four-dimensional tensor $[B_2,H_2,W_2,C_2]$, $W_2$ is a second-dimensional parameter of the feature data of four-dimensional tensor $[B_2,H_2,W_2,C_2]$, and $C_2$ is a first-dimensional parameter of the feature data of four-dimensional tensor $[B_2,H_2,W_2,C_2]$.

Here, in Step 4, multilayer convolution and pooling calculation is performed on the input four-dimensional tensor by using the blood pressure CNN. Here, the blood pressure CNN includes convolutional layers and pooling layers. Generally, one convolutional layer matches one pooling layer and is then connected to the next convolutional layer, and the number of layers of the network depends on the number of the convolutional layers, namely the threshold of convolutional layer number. Assume the threshold of convolutional layer number is 4, convolution and pooling calculation is performed 4 times; and an output result of each layer is used as an input for calculation of the next layer. Assume the total number of the fragment of one-dimensional data sequence of pulse wave [1250] is 5 and the height of pulse wave is still 1, the feature data of four-dimensional tensor is a feature data of four-dimensional tensor $[5,1,W_2,C_2]$.

Step 5, input data of two-dimensional matrix construction of a blood pressure ANN is performed according to the feature data of four-dimensional tensor to generate an input data of two-dimensional matrix;

Step 5 comprises: reduction of tensor dimension is performed on the feature data of four-dimensional tensor $[B_2,H_2,W_2,C_2]$ to generate the input data of two-dimensional matrix, wherein the input data of two-dimensional matrix is an input data of two-dimensional matrix $[W_3,C_3]$, $W_3$ is a second-dimensional parameter of the input data of two-dimensional matrix $[W_3,C_3]$ and is equal to $B_2$, and $C_3$ is a first-dimensional parameter of the input data of two-dimensional matrix $[W_3,C_3]$ and is a product of $H_2$, $W_2$ and $C_2$.

Here, assume the feature data of four-dimensional tensor is $[5,1,W_2,C_2]$, which is specifically $[5,1,20,64]$, the input data of two-dimensional matrix $[W_3,C_3]$ obtained after dimension reduction is $[5,1280]$ (H2*W2*C2=1*20*64).

Step 6, regression calculation of feature data is performed on the input data of two-dimensional matrix by using the blood pressure ANN to generate a two-dimensional matrix of blood pressure regression data [X, 2];

Wherein, X is a second-dimensional parameter of the two-dimensional matrix of blood pressure regression data [X, 2], and the value of X is the total number of fragment.

Step 7, an identifier for prediction mode is obtained;

Wherein, the identifier of prediction mode is an identifier for mean prediction or an identifier for dynamic prediction;

Step 8, when the identifier of prediction mode is the identifier for mean prediction, calculation of mean diastolic pressure data is performed to generate predicted mean diastolic pressure data, and calculation of mean systolic pressure data is performed to generate predicted mean systolic pressure data according to the two-dimensional matrix of blood pressure regression data [X, 2];

Step 8 comprises: all fragments of systolic pressure data included in the two-dimensional matrix of blood pressure regression data [X, 2] is extracted to perform sum calculation to generate a systolic pressure sum, and the predicted mean systolic pressure data is generated according to a quotient obtained by dividing the systolic pressure sum by the total fragment number; all fragment of diastolic pressure data included in the two-dimensional of blood pressure regression data matrix [X, 2] is extracted to perform sum calculation to generate a diastolic pressure sum, and the predicted mean diastolic pressure is generated according to a quotient obtained by dividing the diastolic pressure sum by the total number of fragments; wherein the two-dimensional matrix of blood pressure regression data [X, 2] comprises one-dimensional data sequences of regression data [2], the number of which corresponds to the total number of fragment, and the one-dimensional data sequences of regression data [2] comprise the systolic pressure data of fragments and the diastolic pressure data of fragments.

Assume the two-dimensional matrix of blood pressure regression data [X, 2] is a two-dimensional matrix of blood pressure regression data $[5,2]=\{[D_{11},D_{12}],[D_{21},D_{22}],[D_{31},D_{32}],[D_{41},D_{42}],[D_{51},D_{52}]\}$, one-dimensional data sequences of regression data included in the two-dimensional matrix of blood pressure regression data [5, 2] are, respectively, a one-dimensional data sequence of first regression data $[2]=\{D_{11},D_{12}\}$, a one-dimensional data sequence of second regression data $[2]=\{D_{21},D_{22}\}$, a one-dimensional data sequence of third regression data $[2]=\{D_{31},D_{32}\}$, one-dimensional data sequence of a fourth regression data $[2]=\{D_{41}, D_{42}\}$ and one-dimensional data sequence of a fifth regression data $[2]=\{D_{51},D_{52}\}$, wherein two values in each one-dimensional data sequence of regression data respectively correspond to fragment diastolic pressure data (small one) and fragment systolic pressure data (large one) of a current fragment;

Here, when the identifier for prediction mode is an identifier for the mean prediction, it indicates that a mean blood pressure within the time threshold of acquisition is needed. Assume the time threshold of acquisition is 10 s, blood pressure mean data within this 10 s is calculated. Assume $D_{X1}$ is the diastolic pressure data of fragments, the predicted mean of diastolic pressure data is $(D_{11}+D_{21}+D_{31}+D_{41}+D_{51})/5$. Assume $D_{X2}$ is the systolic pressure data of fragments, the predicted mean of systolic pressure data is $(D_{12}+D_{22}+D_{32}+D_{42}+D_{52})/5$.

Step 9, when the identifier for prediction mode is an identifier for the dynamic prediction, diastolic pressure data and systolic pressure data extraction is performed according to the two-dimensional matrix of blood pressure regression data [X, 2] to generate a predicted one-dimensional data sequence of blood pressure;

Step 9 comprises: Step 91, when the identifier for prediction mode is the dynamic prediction identifier, a predicted one-dimensional data sequence of blood pressure is initialized to be null, a blood pressure data set is set, diastolic pressure data in the blood pressure data set is initialized to be null, and systolic pressure data in the blood pressure data set is initialized to be null; and Step 92, one-dimensional data sequences of recessive data [2] included in the two-dimensional matrix of blood pressure regression data [X, 2] are sequentially extracted to generate a current data sequence [2]; the systolic pressure data in the blood pressure data set is set as systolic pressure data of fragments of the current data sequence [2], and the diastolic pressure data in the blood pressure data set is set as diastolic pressure data of fragments of the current data sequence [2]; and the blood pressure data set is added into the predicted one-dimensional data sequence of blood pressure.

Here, blood pressure data in the two-dimensional matrix of blood pressure regression data [X, 2] is extracted to generate a predicted one-dimensional data sequence of blood pressure reflecting dynamic changes of blood pressure;

Assume the two-dimensional matrix of blood pressure regression data [X, 2] is a two-dimensional matrix of blood pressure regression data $[5,2]=\{[D_{11},D_{12}], [D_{21},D_{22}], [D_{31},D_{32}], [D_{41},D_{42}], [D_{51},D_{52}]\}$, the one-dimensional data sequences of regression data included in the two-dimensional matrix of blood pressure regression data [5, 2] are, respectively, a first one-dimensional data sequence of regression data $[2]=\{D_{11},D_{12}\}$, a second one-dimensional data sequence of regression data $[2]=\{D_{21},D_{22}\}$, a third one-dimensional data sequence of regression data $[2]=\{D_{31}, D_{32}\}$, a fourth one-dimensional data sequence of regression data $[2]=\{D_{41},D_{42}\}$ and a fifth one-dimensional data sequence of regression data $[2]=\{D_{51},D_{52}\}$, wherein two values in each one-dimensional data sequence of regression data respectively correspond to diastolic pressure data (small one) and systolic pressure data (large one) of a current fragment.

The predicted one-dimensional data sequence of blood pressure obtained after extraction is a predicted one-dimensional data sequence of blood pressure [5]={first blood pressure data set, second blood pressure data set, third blood pressure data set, fourth blood pressure data set, fifth blood pressure data set}, wherein diastolic pressure data in the first blood pressure data set is diastolic pressure data of fragment in $[D_{11},D_{12}]$, and systolic pressure data in the first blood pressure data set is systolic pressure data of fragment in $[D_{11},D_{12}]$; . . . ; diastolic pressure data in the fifth blood pressure data set is diastolic pressure data of fragment in $[D_{51},D_{52}]$, and systolic pressure data in the fifth blood pressure data set is systolic pressure data of fragment in $[D_{51},D_{52}]$.

Figure 2:
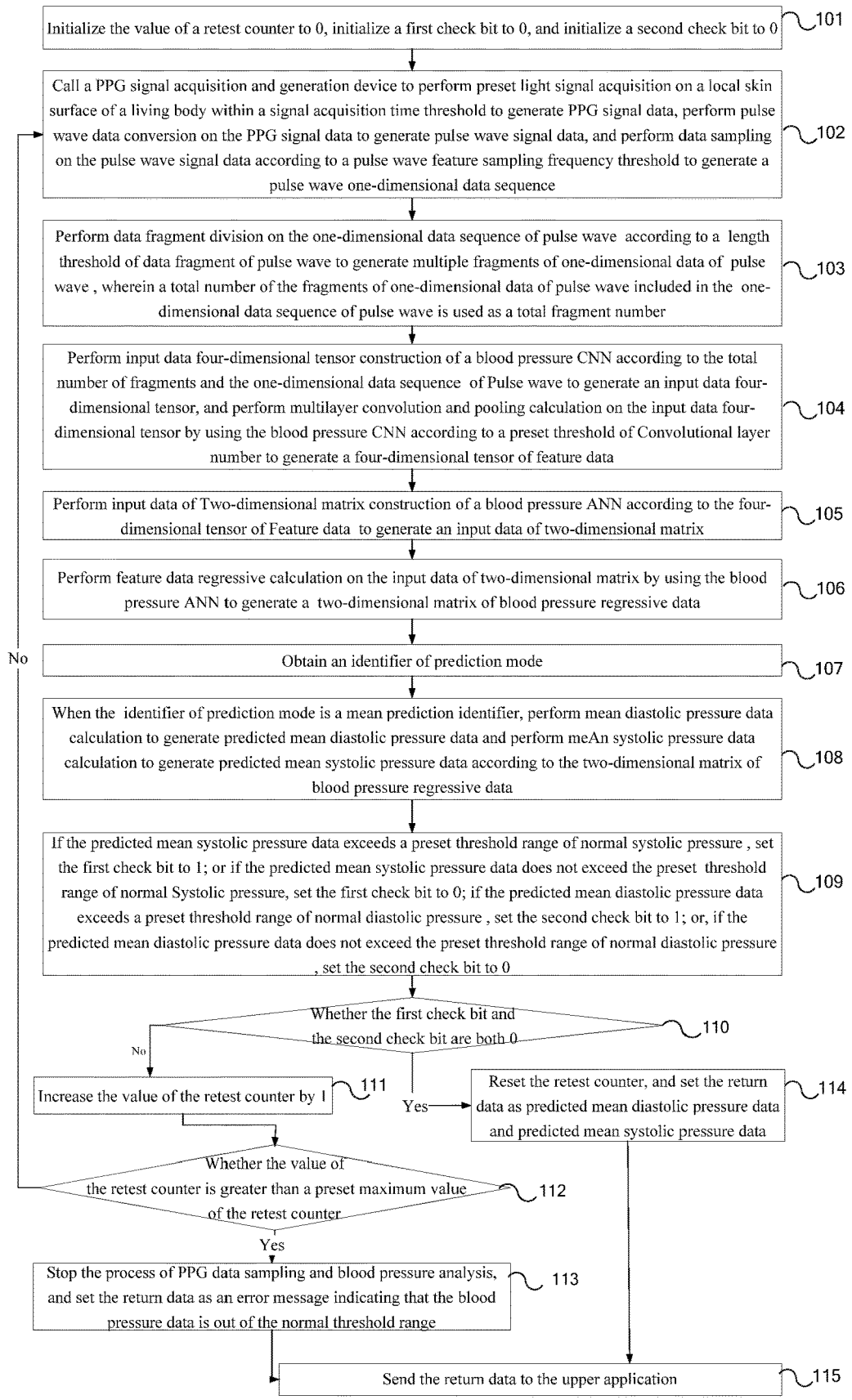
FIG. 2 is a schematic diagram of a blood pressure prediction method provided by Embodiment 2 of the disclosure.

As shown in FIG. 2, which is a schematic diagram of a blood pressure prediction method provided by Embodiment 2 of the disclosure, the blood pressure prediction method mainly comprises the following steps:

Step 101, the value of a retest counter is initialized to 0, a first check bit is initialized to 0, and a second check bit is initialized to 0.

Step 102, a PPG signal acquisition and generation device is called to perform preset light signal acquisition on a local skin surface of a living body within a time threshold of signal acquisition to generate PPG signal data, pulse wave data conversion is performed on the PPG signal data to generate pulse wave signal data, and data sampling is performed on the pulse wave signal data according to a frequency threshold of feature sampling of pulse wave to generate a one-dimensional data sequence of pulse wave.

Here, a preset light signal comprises at least one of a red light signal, an infrared light signal and a green light signal;

Here, the one-dimensional data sequence of pulse wave is specifically a one-dimensional data sequence of pulse wave [A], and A is a first-dimensional parameter of the one-dimensional data sequence of pulse wave [A] and is a product of the time threshold of signal acquisition and the frequency threshold of feature sampling of pulse wave. For example, assume the time threshold of signal acquisition is 10 s and the frequency threshold of feature sampling of pulse wave is 125 Hz, A=125*10=1250, which indicates that 1250 pieces of data are acquired. The one-dimensional data sequence of pulse wave [A] is specifically a one-dimensional data sequence of pulse wave [1250], and is a one-dimensional data sequence that comprises 1250 pieces of independent pulse wave data.

Step 103, data fragment division is performed on the one-dimensional data sequence of pulse wave according to a length threshold of data fragment of pulse wave to generate multiple one-dimensional data fragments of pulse wave, wherein a total number of one-dimensional data fragments of the pulse wave included in the one-dimensional data sequence of pulse wave is used as a total number of fragments.

Here, considering the input requirements of a blood pressure CNN that will be used later to perform feature calculation on data in the one-dimensional data sequence of pulse wave, fragment division is performed on the one-dimensional data sequence of pulse wave according to a maximum input data length of the blood pressure CNN, and the length threshold of data fragment of pulse wave is the maximum length of input data of the blood pressure CNN. The total number of fragments is set as follows: if a total data length of the one-dimensional data sequence of pulse wave can be evenly divided by the length threshold of data fragment of pulse wave, the total number of fragment is a quotient obtained by dividing the one-dimensional data sequence of pulse wave by the length threshold of data fragment of pulse wave; or, if the total length of the one-dimensional data sequence of pulse wave cannot be evenly divided by the length threshold of data fragment of pulse wave, the total number of fragments is a round-off number of the quotient obtained by dividing the one-dimensional data sequence of pulse wave by the length threshold of data fragment of pulse wave. For example, assume the pulse wave data fragment length threshold is 250, the total number of fragment is 1250/250=5; assume the length threshold of data fragment of pulse wave is 200, the total number of fragment is |1250/200|=6.

Step 104, four-dimensional tensor construction of input data for a blood pressure CNN is performed according to the total number of fragments and the one-dimensional data sequence of pulse wave to generate an four-dimensional tensor of input data, and multilayer convolution and pooling calculation is performed on the four-dimensional tensor of input data by using the blood pressure CNN according to a preset threshold of convolutional layer number to generate a four-dimensional tensor of feature data.

Here, obtained data fragments of pulse wave are converted into four-dimensional data, and the four dimensions [B, H, W, C] respectively represent the number of fragments (batch), the height of fragment data (height), the width of the fragment data (width), and the channel of the fragment data (channel). When colored image data is processed, the height, width and channel of fragments respectively correspond to the height, width and RGB channel of an image. Because pulse wave data is a one-dimensional time sequence, the number of fragments B should be set as the total number of fragment, the height H should be set to 1, the channel C should be set to 1, and the width W should be set as a previously set fragment length, namely the length threshold of data fragment of pulse wave. For example, assume the length threshold of data fragment of pulse wave is 250, an four-dimensional tensor of input data obtained by converting the one-dimensional data sequence of pulse wave [1250] is $[B_1,H_1,W_1,C_1]$, which is specifically an four-dimensional tensor of input data [5,1,250,1];

Then, multilayer convolution and pooling calculation is performed on the four-dimensional tensor of input data by using the blood pressure CNN. Here, the blood pressure CNN includes convolutional layers and pooling layers. Generally, one convolutional layer matches one pooling layer and is then connected to the next convolutional layer, and the number of layers of the network depends on the number of the convolutional layers, namely the threshold of convolutional layer number. Assume the threshold of convolutional layer number is 4, convolution and pooling calculation is performed 4 times; and an output result of each layer is used as an input for calculation of the next layer. Here, the four-dimensional tensor of feature data is specifically a four-dimensional tensor of feature data $[B_2,H_2,W_2,C_2]$, wherein $B_2$ is a fourth-dimensional parameter of the four-dimensional tensor of feature data $[B_2,H_2,W_2,C_2]$ and is equal to the total number of fragments, $H_2$ is a third-dimensional parameter of the four-dimensional tensor of feature data $[B_2,H_2,W_2,C_2]$, $W_2$ is a second-dimensional parameter of the four-dimensional tensor of feature data $[B_2,H_2,W_2,C_2]$, and $C_2$ is a first-dimensional parameter of the four-dimensional tensor of feature data $[B_2,H_2,W_2,C_2]$. Assume the total number of fragments for the one-dimensional data sequence of pulse wave [1250] is 5 and the pulse wave height is still 1, the four-dimensional tensor of feature data is a four-dimensional tensor of feature data $[5,1,W_2,C_2]$.

Step 105, two-dimensional matrix construction of input data of a blood pressure ANN is performed according to the four-dimensional tensor of feature data to generate a two-dimensional matrix of input data;

Step 105 comprises: tensor data dimension reduction is performed on the four-dimensional tensor of feature data $[B_2,H_2,W_2,C_2]$ to generate the two-dimensional matrix of input data, wherein the two-dimensional matrix of input data is specifically an two-dimensional matrix of input data $[W_3,C_3]$;

Wherein, $W_3$ is a second-dimensional parameter of the two-dimensional matrix of input data $[W_3,C_3]$ and is equal to $B_2$, and $C_3$ is a first-dimensional parameter of the two-dimensional matrix of input data $[W_3,C_3]$ and is a product of $H_2$, $W_2$ and $C_2$.

Here, assume the four-dimensional tensor of feature data is $[5,1,W_2,C_2]$, which is specifically $[5,1,20,64]$, the two-dimensional matrix of input data $[W_3,C_3]$ obtained after dimension reduction is $[5,1280]$ (H2*W2*C2=1*20*64).

Step 106, feature data regression calculation is performed on the two-dimensional matrix of input data by using the blood pressure ANN to generate a two-dimensional matrix of regression data of blood pressure [X, 2];

Wherein, X is a second-dimensional parameter of the two-dimensional matrix of regression data of blood pressure [X, 2], and the value of X is the total number of fragments.

Step 107, an identifier for prediction mode is obtained;

Wherein, the identifier for prediction mode is an identifier for mean prediction or an identifier for dynamic prediction;

Step 108, when the identifier for prediction mode is the identifier for mean prediction, mean diastolic pressure data calculation is performed to generate predicted mean diastolic pressure data and mean systolic pressure data calculation is performed to generate predicted mean systolic pressure data according to the blood pressure regression data two-dimensional matrix [X, 2];

Step 108 comprises: Step 1081, when the identifier for prediction mode is the identifier for mean prediction, a temporary one-dimensional data sequence of predicted blood pressure is initialized to be null, a blood pressure data set is set, diastolic pressure data in the blood pressure data set is initialized to be null, and systolic pressure data of the blood pressure data set is initialized to be null;

Step 1082, recessive data one-dimensional data sequences included in the regression data two-dimensional matrix [X, 2] of blood pressure are sequentially extracted to generate a current one-dimensional sequence [2]; systolic pressure data in the blood pressure data set is set as fragment systolic pressure data of the current data sequence [2], and diastolic pressure data in the blood pressure data set is set as fragment diastolic pressure data of the current one-dimensional data sequence [2]; and the blood pressure data set is added into the predicted blood pressure one-dimensional data sequence;

Here, in Step 1081 and Step 1082, blood pressure data in the two-dimensional matrix [X, 2] of regression data of blood pressure is extracted to generate the temporary one-dimensional data sequence of predicted blood pressure that is used for mean calculation later, wherein the two-dimensional matrix [X, 2] of regression data of blood pressure comprises the total fragment number of one-dimensional data sequence of regression data, and the current one-dimensional data sequence [2] comprises fragment diastolic pressure data and fragment systolic pressure data;

Step 1083, sum calculation is performed on diastolic pressure data of all blood pressure data sets included in the temporary one-dimensional data sequence of predicted blood pressure to generate a diastolic pressure sum, and predicted mean diastolic pressure data is generated according to a quotient obtained by dividing the diastolic pressure sum by the total number of fragments; sum calculation is performed on systolic pressure data of all the blood pressure data sets included in the temporary one-dimensional data sequence of predicted blood pressure to generate a systolic pressure sum, and predicted mean systolic pressure data is generated according to a quotient obtained by dividing the systolic pressure sum by the total number of fragments.

Here, when the identifier for prediction mode is the identifier for mean prediction, it indicates that a mean blood pressure of blood pressure data within the time threshold of acquisition is needed, wherein predicted mean diastolic pressure data=fragment diastolic pressure sum/total number of fragment, and predicted mean systolic pressure data=fragment systolic pressure sum/total number of fragment.

Step 109, if the predicted mean systolic pressure data exceeds a preset normal threshold range of systolic pressure, the first check bit is set to 1; or if the predicted mean of systolic pressure data does not exceed the preset normal threshold range of systolic pressure, the first check bit is set to 0; if the predicted mean of diastolic pressure data exceeds a preset normal threshold range of diastolic pressure, the second check bit is set to 1; or, if the predicted mean of diastolic pressure data does not exceed the preset normal threshold range of diastolic pressure, the second check bit is set to 0.

Herein, whether the predicted data is within a normal range is determined; if all the predicted data is within the normal range, the first check bit and the second check bit are both set to 0; otherwise, the first check bit and the second check bit are both set to 1.

Step 110, whether the first check bit and the second check bit are both 0 is determined; if the first check bit and the second check bit are both 0, Step 114 is performed; or, if the first check bit and the second check bit are not both 0, Step 111 is performed.

Herein, if the first check bit and the second check bit are both 0, it indicates that all the data are within the normal range of blood pressure, and Step 114 is performed to prepare return data; otherwise, Step 111 to Step 113 are performed to perform retesting.

Step 111, the value of the retest counter is increased by 1.

Step 112, whether the value of the retest counter is greater than a preset maximum value of the retest counter is determined; if the value of the retest counter is greater than the preset maximum value of the retest counter, Step 113 is performed; or, if the value of the retest counter is less than or equal to the preset maximum value of the retest counter, Step 102 is performed.

Here, in the embodiments of the disclosure, if the value of the retest counter is within an allowable range, PPG signals need to be reacquired, and blood pressure prediction should be performed again according to reacquired PPG data; or, if the value of the retest counter is out of the allowable range, it indicates that an error may be caused by many factors: an error of an acquisition sensor, and an abnormal actual blood pressure of the human body. No matter which error is caused, the current acquisition and analysis process should be stopped to remind the user or the subject, so Step 113 will be performed to process the error.

Step 113, the process of PPG data sampling and blood pressure analysis is stopped, and the return data is set as an error message indicating that the blood pressure data is out of the normal threshold range; and Step 115 is performed.

Here, the operation mentioned above is performed, and the return data prepared for an upper application is set as an error message indicating that the blood pressure data is out of the normal threshold range.

Step 114, the retest counter is reset, and the return data is set as predicted mean of diastolic pressure data plus predicted mean of systolic pressure data.

Here, if no error occurs in the whole process, the return data prepared for the upper application is set as predicted mean of diastolic pressure data plus predicted mean of systolic pressure data.

Step 115, the return data is sent to the upper application.

Herein, the upper application may be a function, software, a system or a hardware module according to the actual application scenario.

Figure 3:
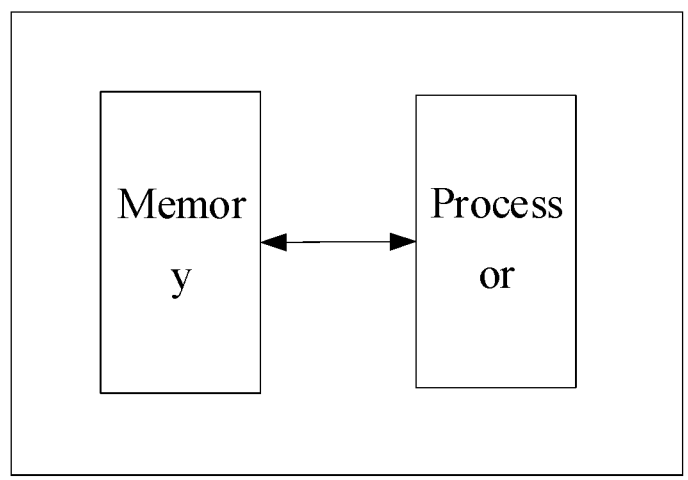
FIG. 3 is a structural diagram of a blood pressure prediction device provided by Embodiment 3 of the disclosure.

As shown in FIG. 3, which is a schematic diagram of a blood pressure prediction device provided by Embodiment 3 of the disclosure. Equipment comprises: a processor and a memory. The memory may be connected to the process through a bus. The memory may be a nonvolatile memory such as a hard disk drive or a flash memory, and a software program and an equipment drive program are stored in the memory. The software program can implement all functions of the method provided by the embodiments of the disclosure, and the equipment drive program may be a network and interface drive program. The processor is used to execute the software program, and when the software program is executed, the method provided by the embodiments of the disclosure is implemented.

It should be noted that the embodiments of the disclosure further provide a computer-readable storage medium having a computer program stored therein, and when the computer program is executed by a processor, the method provided by the embodiments of the disclosure is implemented.

The embodiments of the disclosure further provide a computer program product comprising instructions. When the computer program product runs on a computer, a processor implements the method mentioned above.

According to the blood pressure prediction method and device provided by the embodiments of the disclosure, a PPG acquisition device is used to acquire PPG data of a subject, and an intelligent network model formed by a blood pressure CNN model and a blood pressure ANN model is used to predict blood pressure data (diastolic pressure and systolic pressure) according to the acquired PPG data. By adoption of the method and device provided by the embodiments of the disclosure, the complexity and discomfort caused by conventional measurement methods are avoided, and an automatic and intelligent data analysis method is generated, so users can repeatedly and continuously monitor a measured object conveniently.

Those skilled should further appreciate that the units and arithmetic steps described in conjunction with the embodiments in this specification may be implemented by electronic hardware, computer software, or a combination of these two. To clearly explain the interchangeability of hardware and software, the components and steps of illustrative embodiments have been generally described according to their functions. Whether these functions are implemented by hardware or software depends on specific applications and design constraints of the technical solutions. For each specific application, those skilled may implement these functions in different ways, which should not be construed as exceeding the scope of the disclosure.

The steps of the method or algorithm described in the embodiments in this specification may be implemented by hardware, software modules executed by a processor, or a combination of these two. The software modules may be configured in a random access memory (RAM), a read-only memory (ROM), an electrically programmable ROM, an electrically erasable and programmable ROM, a register, a hard disk, a removable disk, a CD-ROM, or a storage medium in any other forms in the art.

The purposes, technical solutions and beneficial effects of the embodiments of the disclosure are described in further detail with reference to the above specific implementations. It should be understood that the above implementations are merely specific ones of the disclosure, and are not used to limit the protection scope of the invention as recited in the claims. Any amendments, equivalent substitutions, and improvements made based on the spirit and principle of the disclosure should also fall within the protection scope of the invention as recited in the claims.

What is claimed is:

1. A blood pressure prediction method, comprising:

performing pulse wave conversion and sampling on photoplethysmography (PPG) signal data to generate a one-dimensional data sequence of pulse wave, and performing data fragment division on the one-dimensional data sequence of pulse wave according to a length threshold of fragments of pulse wave data to generate multiple one-dimensional data fragments of pulse wave, wherein a total number of the one-dimensional data fragments of pulse wave included in the one-dimensional data sequence of pulse wave is used as a total number of fragments;

performing four-dimensional tensor construction of input data of a blood pressure convolutional neural network (CNN) according to the total number of fragments and the one-dimensional data sequence of pulse wave to generate a four-dimensional tensor of input data;

performing multilayer convolution and pooling calculation on the four-dimensional tensor of input data by using the blood pressure CNN according to a preset threshold of convolutional layer number to generate a four-dimensional tensor of feature data;

performing two-dimensional matrix construction of input data of a blood pressure artificial neural network (ANN) according to the four-dimensional tensor of feature data to generate a two-dimensional matrix of input data;

performing regression calculation of feature data on the two-dimensional matrix [X, 2] of input data by using the blood pressure ANN to generate a two-dimensional matrix [X, 2] of regression data of blood pressure, wherein X is a second-dimensional parameter of the two-dimensional matrix [X, 2] of regression data of blood pressure, and the value of X is the total number of fragments;

obtaining an identifier for prediction mode, wherein the identifier for prediction mode is an identifier for mean prediction or an identifier for dynamic prediction;

performing mean diastolic pressure data calculation to generate predicted mean of diastolic pressure data and performing mean systolic pressure data calculation to generate predicted mean of systolic pressure data according to the two-dimensional matrix of regression data of blood pressure when the identifier for prediction mode is the identifier for mean prediction; or performing diastolic pressure data and systolic pressure data extraction according to the two-dimensional matrix of regression data of blood pressure to generate a predicted one-dimensional data sequence of blood pressure when the identifier for prediction mode is the identifier for dynamic prediction.

2. The blood pressure prediction method according to claim 1, wherein the step of performing pulse wave conversion and sampling on PPG signal data to generate a one-dimensional data sequence of pulse wave comprises:

controlling a PPG signal acquisition and generation device to perform preset light signal acquisition on a local skin surface of a living body within a time threshold of signal acquisition to generate the PPG signal data, wherein a preset light signal comprises at least one of a red light signal, an infrared light signal and a green light signal;

performing pulse wave data conversion on the PPG signal data to generate pulse wave signal data; and performing data sampling on the pulse wave signal data according to a frequency threshold of feature sampling of pulse wave to generate the one-dimensional data sequence of pulse wave, wherein the one-dimensional data sequence [A] of pulse wave is a one-dimensional data sequence of pulse wave, and A is a first-dimensional parameter in the one-dimensional data sequence [A] of pulse wave and is a product of the time threshold of signal acquisition and the frequency threshold of feature sampling of pulse wave.

3. The blood pressure prediction method according to claim 1, wherein the step of performing four-dimensional tensor construction of input data of a blood pressure CNN according to the total number of fragments and the one-dimensional data sequence of pulse wave to generate a four-dimensional tensor of input data comprises:

a Step 31, setting the four-dimensional tensor of input data as a four-dimensional tensor $[B_1, H_1, W_1, C_1]$ of input data, wherein the four-dimensional tensor $[B_1, H_1, W_1, C_1]$ of input data comprises $B_1$ pieces of three-dimensional tensor data $[H_1, W_1, C_1]$, $B_1$ is a fourth-dimensional parameter in the four-dimensional tensor $[B_1, H_1, W_1, C_1]$ of input data and is equal to the total number of fragments, $H_1$ is a third-dimensional parameter of the four-dimensional tensor $[B_1, H_1, W_1, C_1]$ of input data and has a value of 1, $W_1$ is a second-dimensional parameter in the four-dimensional tensor $[B_1, H_1, W_1, C_1]$ of input data and is equal to the length threshold of data fragment of pulse wave, and $C_1$ is a first-dimensional parameter in the four-dimensional tensor $[B_1, H_1, W_1, C_1]$ of input data and has a value of 1;

a Step 32, initializing all the $B_1$ pieces of three-dimensional tensor data $[H_1, W_1, C_1]$ in the four-dimensional tensor $[B_1, H_1, W_1, C_1]$ of input data to be null, initializing a first index to 1, and initializing a first total number to the total number of fragments;

a Step 33, assigning values to matrix elements of the $B_1$ pieces of three-dimensional tensor data $[H_1, W_1, C_1]$, corresponding to the first index, in the four-dimensional tensor $[B_1, H_1, W_1, C_1]$ of input data according to the one-dimensional data fragments of pulse wave, corresponding to the first index, in the one-dimensional data sequence of pulse wave;

a Step 34, increasing the first index by 1;

a Step 35, determining whether the first index is greater than the first total number; if the first index is greater than the first total number, performing a Step 36, transferring the four-dimensional tensor of input data with the matrix elements being assigned with values to an upper application as a construction result of four-dimensional tensor $[B_1, H_1, W_1, C_1]$ of input data; or, if the first index is less than or equal to the first total number, performing the Step 33.

4. The blood pressure prediction method according to claim 1, wherein the step of performing multilayer convolution and pooling calculation on the four-dimensional tensor of input data by using the blood pressure CNN according to the preset threshold of convolutional layer number to generate a four-dimensional tensor of feature data comprises:

a Step 41, initializing a second index to 1, initializing a second total number to the preset threshold of convolutional layer number, and initializing a second-index temporary four-dimensional tensor to the four-dimensional tensor of input data;

a Step 42, performing convolution calculation on the second-index temporary four-dimensional tensor by using a second-index convolutional layer of the blood pressure CNN to generate a second-index convolutional output data four-dimensional tensor, and performing pooling calculation on the second-index convolutional output data four-dimensional tensor by using a second-index pooling layer of the blood pressure CNN to generate a second-index pooling output data four-dimensional tensor, wherein the blood pressure CNN comprises multiple convolutional layers and multiple pooling layers;

a Step 43, setting the second-index temporary four-dimensional tensor as the second-index pooling output data four-dimensional tensor;

a Step 44, increasing the second index by 1;

a Step 45, determining whether the second index is greater than the second total number; if the second index is greater than the second total number, performing a Step 46, setting the four-dimensional tensor of feature data as the second-index temporary four-dimensional tensor; or, if the second index is less than or equal to the second total number, performing the Step 42.

5. The blood pressure prediction method according to claim 1, wherein the step of performing two-dimensional matrix construction of input data of a blood pressure ANN according to the four-dimensional tensor of feature data to generate a two-dimensional matrix of input data comprises:

the four-dimensional tensor of feature data being a four-dimensional tensor $[B_2, H_2, W_2, C_2]$ of feature data, $B_2$ being a fourth-dimensional parameter of the four-dimensional tensor $[B_2, H_2, W_2, C_2]$ of feature data and being equal to the total number of fragments, $H_2$ being a third-dimensional parameter of the four-dimensional tensor $[B_2, H_2, W_2, C_2]$ of feature data, $W_2$ being a second-dimensional parameter of the four-dimensional tensor $[B_2,H_2,W_2,C_2]$ of feature data, and $C_2$ being a first-dimensional parameter of the four-dimensional tensor $[B_2,H_2,W_2,C_2]$ of feature data; and performing tensor data dimension reduction on the four-dimensional tensor $[B_2,H_2,W_2,C_2]$ of feature data to generate the two-dimensional matrix of input data, wherein the two-dimensional matrix $[W_3, C_3]$ of input data is a two-dimensional matrix of input data, $W_3$ is a second-dimensional parameter of the two-dimensional matrix $[W_3, C_3]$ of input data and is equal to $B_2$, and $C_3$ is a first-dimensional parameter of the two-dimensional matrix $[W_3, C_3]$ of input data and is a product of $H_2$, $W_2$ and $C_2$.

6. The blood pressure prediction method according to claim 1, wherein the step of performing mean diastolic pressure data calculation to generate predicted mean diastolic pressure data and performing mean systolic pressure data calculation to generate predicted mean systolic pressure data according to the two-dimensional matrix [X, 2] of regression data of blood pressure when the identifier for prediction mode is the identifier for mean prediction identifier specifically comprises:

extracting systolic pressure data of all fragments included in the two-dimensional matrix [X, 2] of regression data of blood pressure to perform sum calculation to generate a systolic pressure sum, and generating the mean prediction of systolic pressure data according to a quotient obtained by dividing the systolic pressure sum by the total number of fragments; and extracting diastolic pressure data of all fragments included in the two-dimensional matrix [X, 2] of regression data of blood pressure to perform sum calculation to generate a diastolic pressure sum, and generating the mean prediction of diastolic pressure according to a quotient obtained by dividing the diastolic pressure sum by the total number of fragments;

wherein the two-dimensional matrix [X, 2] of regression data of blood pressure comprises the total number of fragments of one-dimensional data sequences [2] of regression data, and the one-dimensional data sequences [2] of regression data comprise the systolic pressure data of all fragments and the diastolic pressure data of all fragments.

7. The blood pressure prediction method according to claim 6, wherein the step of performing diastolic pressure data and systolic pressure data extraction according to the two-dimensional matrix [X, 2] of regression data of blood pressure to generate a one-dimensional data sequence of predicted blood pressure when the identifier for prediction mode is the identifier for dynamic prediction comprises:

initializing a one-dimensional data sequence of predicted blood pressure to be null, setting a blood pressure data set, initializing diastolic pressure data in the blood pressure data set to be null, and initializing systolic pressure data in the blood pressure data set to be null; and sequentially extracting the one-dimensional data sequences [2] of recessive data included in the two-dimensional matrix [X, 2] of regression data of blood pressure to generate a current data sequence [2]; setting the systolic pressure data in the blood pressure data set as fragment systolic pressure data of the current data sequence [2], and setting the diastolic pressure data in the blood pressure data set as fragment diastolic pressure data of the current data sequence [2]; and adding the blood pressure data set into the one-dimensional data sequence of predicted blood pressure.

\* \* \* \* \*